United States Patent
Miklós et al.

(10) Patent No.: US 12,244,491 B2
(45) Date of Patent: Mar. 4, 2025

(54) UE ROUTE SELECTION POLICIES FOR MULTI-PORT DEVICES

(71) Applicant: Telefonaktiebolaget LM Ericsson (publ), Stockholm (SE)

(72) Inventors: György Miklós, Pilisborosjenő (HU); Balázs Varga, Budapest (HU); János Farkas, Kecskemét (HU); János Harmatos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 17/630,777

(22) PCT Filed: Jul. 29, 2020

(86) PCT No.: PCT/IB2020/057148
§ 371 (c)(1),
(2) Date: Jan. 27, 2022

(87) PCT Pub. No.: WO2021/019458
PCT Pub. Date: Feb. 4, 2021

(65) Prior Publication Data
US 2022/0272031 A1    Aug. 25, 2022

Related U.S. Application Data

(60) Provisional application No. 62/880,198, filed on Jul. 30, 2019.

(51) Int. Cl.
*H04L 45/302* (2022.01)
*H04L 67/141* (2022.01)
(Continued)

(52) U.S. Cl.
CPC .......... *H04L 45/306* (2013.01); *H04L 67/141* (2013.01); *H04W 40/02* (2013.01); *H04W 48/18* (2013.01)

(58) Field of Classification Search
None
See application file for complete search history.

(56) References Cited

U.S. PATENT DOCUMENTS

| 9,985,947 | B1 * | 5/2018 | Elhard | ............. H04L 63/08 |
| 2008/0266133 | A1 * | 10/2008 | Martin | ............. G01D 4/002 |
| | | | | 340/870.02 |

(Continued)

FOREIGN PATENT DOCUMENTS

CN    109743766 A    5/2019

OTHER PUBLICATIONS

U.S. Appl. No. 62/717,352, filed Aug. 10, 2018, Huang-Fu et al., "Performance Enhancement in 5G System".*

(Continued)

*Primary Examiner* — Gregory B Sefcheck
(74) *Attorney, Agent, or Firm* — Sage Patent Group

(57) ABSTRACT

A method for establishing a Protocol Data Unit (PDU) Session(s) is disclosed. In examples disclosed herein, a device (e.g., a wireless device) uses a unique Port Number(s) (e.g., an internal physical or logical Port Number) to search for a matching User Equipment (UE) Route Selection Policies (URSP) rule(s) having a Traffic Descriptor(s) that matches the unique Port Number(s). The device then determines whether there exists a matching PDU Session(s) associated with a Route Selection Descriptor(s) of the matching URSP rule(s). Accordingly, the device can reuse the matching PDU Session(s) in a presence of the matching PDU Session(s) or establish a new PDU Session(s) in an absence of the matching PDU Session(s). By using the unique Port Number(s) as the Traffic Descriptor(s) in the URSP rule(s), it is possible to simplify configuration of the device, especially for redundant traffic handling.

5 Claims, 13 Drawing Sheets

(51) Int. Cl.
*H04W 40/02* (2009.01)
*H04W 48/18* (2009.01)

(56) References Cited

U.S. PATENT DOCUMENTS

| | | | | |
|---|---|---|---|---|
| 2014/0192781 | A1* | 7/2014 | Teyeb | H04W 36/32 370/328 |
| 2016/0156623 | A1* | 6/2016 | Liang | H04W 12/06 713/168 |
| 2019/0394279 | A1* | 12/2019 | Dao | H04W 48/04 |
| 2020/0053622 | A1* | 2/2020 | Huang-Fu | H04W 8/183 |
| 2020/0084663 | A1* | 3/2020 | Park | H04W 76/27 |
| 2020/0107213 | A1* | 4/2020 | Park | H04L 41/0806 |
| 2020/0267785 | A1* | 8/2020 | Talebi Fard | H04W 40/246 |
| 2020/0351409 | A1* | 11/2020 | Karampatsis | H04W 76/30 |
| 2020/0351980 | A1* | 11/2020 | Talebi Fard | H04W 68/00 |
| 2020/0359295 | A1* | 11/2020 | Huang-Fu | H04W 80/10 |
| 2021/0084581 | A1* | 3/2021 | Yang | H04W 76/10 |
| 2021/0120596 | A1* | 4/2021 | Youn | H04W 76/12 |
| 2021/0219357 | A1* | 7/2021 | Talebi Fard | H04W 76/11 |
| 2023/0037685 | A1* | 2/2023 | Han | H04L 12/4641 |

OTHER PUBLICATIONS

U.S. Appl. No. 62/806,185, filed Feb. 15, 2019, Talebi Fard et al., "Device Configuration for Time Sensitive Network Bridge".*

U.S. Appl. No. 62/730,206, filed Sep. 12, 2018, Park et al., "Packet Duplication by Wireless Device".*

U.S. Appl. No. 62/733,843, filed Sep. 20, 2018, Park et al., "Packet Duplication by Access Node".*

Author Unknown, "Technical Specification Group Services and System Aspects; System Architecture for the 5G System; Stage 2 (Release 16)," Technical Specification 23.501, Version 16.1.0, Jun. 2019, 3GPP Organizational Partners, 368 pages.

Author Unknown, "Technical Specification Group Services and Sysem Aspects; Procedures for the 5G System; Stage 2 (Release 16)," Technical Specification 23.502, Version 16.1.0, Jun. 2019, 3GPP Organizational Partners, 500 pages.

Author Unknown, "Technical Specification Group Services and Sysem Aspects; Policy and Charging Control Framework for the 5G System; Stage 2 (Release 16)," Technical Specification 23.503, Version 16.1.0, Jun. 2019, 3GPP Organizational Partners, 99 pages.

Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.

Oppo, et al., "S2-1904769: Clarification to support associating URLLC traffic to redundant PDU sessions," Change Request, 3GPP TSG-SA WG2 Meeting #132, Apr. 8-12, 2019, Xi'an, China, 4 pages.

International Search Report and Written Opinion for International Patent Application No. PCT/IB2020/057148, mailed Oct. 9, 2020, 16 pages.

* cited by examiner

UE ROUTE SELECTION POLICIES FOR MULTI-PORT DEVICES

RELATED APPLICATIONS

This application is a 35 U.S.C. § 371 national phase filing of International Application No. PCT/IB2020/057148, filed Jul. 29, 2020, which claims the benefit of provisional patent application Ser. No. 62/880,198, filed Jul. 30, 2019, the disclosures of which are hereby incorporated herein by reference in their entireties.

TECHNICAL FIELD

The technology of the disclosure relates generally to establishing a Protocol Data Unit (PDU) session(s) in a device.

BACKGROUND

The current Third Generation Partnership Project (3GPP) system uses a standardized User Equipment (UE) Route Selection Policies (URSP) mechanism in Fifth Generation (5G) to help upper layers (e.g., the operating system in a device and/or applications) to select an appropriate Protocol Data Unit (PDU) session for data traffic, or to establish a new PDU Session in a device. The URSP mechanism is specified in 3GPP TS 23.503 section 6.6.2. The URSP mechanism is based on a set of URSP rules that are downloaded from a 3GPP network's Protocol Control Function (PCF) to a URSP function of a UE. The URSP rules include one or more Traffic Descriptors that define which URSP rule to apply for traffic with a given characteristic(s). The upper layer's request is matched against the Traffic Descriptors of the URSP rules. The device uses the Route Selection Descriptors of the matching rules, which include parameters to be used for the PDU Session, to select an appropriate PDU Session or to establish a new PDU Session for the data traffic. If a PDU Session with the specified parameters already exists, then the PDU Session will be used for the data traffic. Otherwise, a new PDU Session with the specified parameters will be established. As illustrated in FIG. 1, a device includes a UE (e.g., a modem as specified by 3GPP), in which a URSP function is implemented, and upper layers that associate data traffic with PDU Sessions (1 and 2 in this example). The USRP function is configured with one or more USRP rules.

In many cases, multiple PDU Sessions (e.g., PDU Sessions 1 and 2) are established by different applications for different purposes. There are however cases where the same application may establish multiple PDU Sessions.

Specifically, for redundancy reasons, it may be possible to establish multiple PDU Sessions and duplicate a same data traffic over the multiple PDU Sessions. Such a solution is described in 3GPP TS 23.501 section 5.33.2.1.

The use of URSP for such redundant PDU Session handling is described as follows (as agreed in S2-1904769).

In order to establish two redundant PDU Sessions and associate the duplicated traffic coming from the same application to the redundant PDU Sessions, URSP or UE local configuration is used as specified in TS 23.503.

Using URSP, the duplicated traffic from the application associated with the redundant PDU Sessions is differentiated by two distinct Traffic Descriptors each corresponding to a distinct URSP rule. The distinct Traffic Descriptors need to have different Data Network Names (DNNs), Internet Protocol (IP) descriptors, or non-IP descriptors (e.g., Media Access Control (MAC) address, VLAN ID) so that the two redundant PDU Sessions are matched to respective Route Selection Descriptors of distinct URSP rules.

The note above mentions specifically the data traffic associated with the two PDU Sessions may be differentiated by the Traffic Descriptors consisting of DNNs, IP descriptors, or non-IP descriptors (e.g., IP or Ethernet header fields).

In certain cases, the application may need to communicate based on different transport parameters (e.g., certain traffic may be time sensitive, whereas other traffic may not be). In this regard, the PDU Sessions may need to be established with different parameters. Notably, the URSP mechanism may be configured to provide the PDU Session parameters for such cases.

SUMMARY

Embodiments disclosed herein include a method for establishing a Protocol Data Unit (PDU) Session(s). In examples disclosed herein, a device (e.g., a wireless device) uses a unique Port Number(s) (e.g., an internal physical or logical Port Number) to search for a matching User Equipment (UE) Route Selection Policies (URSP) rule(s) having a Traffic Descriptor(s) that matches the unique Port Number(s). The device then determines whether there exists a matching PDU Session(s) associated with a Route Selection Descriptor(s) of the matching URSP rule(s). Accordingly, the device can reuse the matching PDU Session(s) in the presence of the matching PDU Session(s) or establish a new PDU Session(s) in absence of the matching PDU Session(s). By using the unique Port Number(s) as the Traffic Descriptor(s) in the URSP rule(s), it is possible to avoid pre-configuring Data Network Names (DNNs), Internet Protocol (IP) descriptors, and/or non-IP descriptors as the Traffic Descriptor(s) in the device, thus helping to simplify configuration of the device, especially for redundant traffic handling.

In one embodiment, a method performed by a wireless device for establishing a PDU Session is provided. The method includes receiving a PDU Session request associated with an upper layer and comprising a unique Port Number. The method also includes searching a set of URSP rules each comprising a Traffic Descriptor and a Route Selection Descriptor to determine a matching URSP rule having the Traffic Descriptor matching the unique Port Number. The method also includes determining whether there exists a matching PDU Session associated with the Route Selection Descriptor of the matching URSP rule. The method also includes reusing the matching PDU Session for the PDU Session request in response to determining that the matching PDU Session exists. The method also includes establishing a new PDU Session for the PDU Session request based on the route selecting descriptor of the matching URSP rule in response to determining that the matching PDU Session does not exist.

In another embodiment, the method also includes downloading the set of URSP rules from a Policy Control Function, PCF, and storing the set of URSP rules in a User Equipment, UE, residing in the wireless device.

In another embodiment, the method also includes receiving the PDU Session request from the upper layer via an Ethernet host, wherein: the upper layer and the Ethernet host reside inside the wireless device and the Ethernet host is coupled to the UE via one or more ports associated with one or more unique Port Numbers, respectively.

In another embodiment, the method also includes, at the Ethernet host, generating the PDU Session request comprising the unique Port Number among the one or more unique Port Numbers, providing the PDU Session request comprising the unique Port Number to the UE, associating the matching PDU Session or the new PDU Session with a respective one of the one or more ports associated with the unique Port Number in the PDU Session request, receiving PDU traffic from the upper layer, and providing the PDU traffic to the respective one of the one or more ports associated with the unique Port Number in the PDU Session request.

In another embodiment, the Ethernet host includes a Frame Replication and Elimination for Reliability (FRER) function configured to replicate/eliminate the PDU traffic across the one or more ports.

In another embodiment, the method also includes receiving the PDU Session request from the upper layer via an Ethernet host and an Ethernet bridge, wherein: the Ethernet bridge resides inside the wireless device and is coupled to the UE via one or more ports associated with one or more unique Port Numbers, respectively, the upper layer and the Ethernet host reside in an Endhost separated from the wireless device, and the Ethernet host is coupled to the Ethernet bridge via a single interface. The Ethernet host is configured to receive traffic via the respective single interface coupled to the upper layer and provide the traffic to the respective single interface coupled to the Ethernet bridge.

In another embodiment, the method also includes, at the Ethernet bridge, generating the PDU Session request comprising the unique Port Number among the one or more unique Port Numbers, providing the PDU Session request comprising the unique Port Number to the UE, associating the matching PDU Session or the new PDU Session with a respective one of the one or more ports associated with the unique Port Number in the PDU Session request, receiving the traffic from the Ethernet host, and bridging the traffic to the respective one of the one or more ports associated with the unique Port Number in the PDU Session request.

In another embodiment, the Ethernet bridge includes an FRER function configured to replicate/eliminate the PDU traffic across the one or more ports.

In another embodiment, the method also includes receiving the PDU Session request from the upper layer via an Ethernet host and a relay function, wherein: the relay function resides inside the wireless device and is coupled to the UE via one or more internal ports associated with one or more unique Port Numbers, respectively, the upper layer and the Ethernet host reside in an Endhost separated from the wireless device, and the Ethernet host is coupled to the relay function via one or more physical ports each mapped to a respective one of the one or more internal ports. The Ethernet host is configured to receive traffic from the upper layer and provide the traffic to the relay function via at least one of the one or more physical ports.

In another embodiment, the method also includes, at the relay function, generating the PDU Session request comprising the unique Port Number among the one or more unique Port Numbers, providing the PDU Session request comprising the unique Port Number to the UE, associating the matching PDU Session or the new PDU Session with a respective one of the one or more ports associated with the unique Port Number in the PDU Session request, receiving the traffic from the Ethernet host via the at least one of the one or more physical ports, and relaying the traffic to a respective one of the one or more internal ports associated with the unique Port Number in the PDU Session request.

In another embodiment, the Ethernet host includes an FRER function configured to replicate/eliminate the PDU traffic across the one or more physical ports.

In another embodiment, the method also includes receiving the PDU Session request from the upper layer via an Ethernet host, an Ethernet bridge, and a relay function, wherein: the relay function resides inside the wireless device and is coupled to the UE via one or more internal ports associated with one or more unique Port Numbers, respectively, the Ethernet bridge resides in a bridge device separated from the wireless device, the upper layer and the Ethernet host reside in an Endhost separated from the bridge device and the wireless device, the Ethernet host is coupled to the Ethernet bridge via a respective single interface, and the Ethernet bridge is coupled to the relay function via one or more physical ports each mapped to a respective one of the one or more internal ports. The Ethernet host is configured to receive traffic from the upper layer and provide the traffic to the respective single interface coupled to the Ethernet bridge. The Ethernet bridge is configured to provide the traffic to the relay function via at least one of the one or more physical ports.

In another embodiment, the method also includes, at the relay function: generating the PDU Session request comprising the unique Port Number among the one or more unique Port Numbers, providing the PDU Session request comprising the unique Port Number to the UE, associating the matching PDU Session or the new PDU Session with a respective one of the one or more ports associated with the unique Port Number in the PDU Session request, receiving the traffic from the Ethernet bridge via the at least one of the one or more physical ports, and relaying the traffic to a respective one of the one or more internal ports associated with the unique Port Number in the PDU Session request.

In another embodiment, the Ethernet bridge comprises an FRER function configured to replicate/eliminate the PDU traffic across the one or more physical ports.

In another embodiment, the method also includes receiving the PDU Session request from the upper layer residing inside the wireless device, wherein the upper layer is coupled to the UE via one or more ports associated with one or more unique Port Numbers, respectively.

In another embodiment, the method also includes, at the upper layer: generating the PDU Session request comprising the unique Port Number among the one or more unique Port Numbers, providing the PDU Session request comprising the unique Port Number to the UE, associating the matching PDU Session or the new PDU Session with a respective one of the one or more ports associated with the unique Port Number in the PDU Session request, and generating and providing traffic to the respective one of the one or more ports associated with the unique Port Number in the PDU Session request.

In another embodiment, a wireless device is provided. The wireless device includes processing circuitry configured to perform any of the steps performed by the UE in any of the above embodiments. The wireless device also includes power supply circuitry configured to supply power to the wireless device.

In another embodiment, an apparatus is provided. The apparatus includes a wireless device. The wireless device includes processing circuitry configured to perform any of the steps performed by the UE in any of the previous embodiments. The wireless device also includes power supply circuitry configured to supply power to the wireless device.

In another embodiment, the apparatus also includes an Endhost separated from the wireless device, the Endhost comprising an upper layer and an Ethernet host coupled between the upper layer and the wireless device.

In another embodiment, the apparatus also includes a bridge device separated from the Endhost and the wireless device, the bridge device is coupled between the Endhost and the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
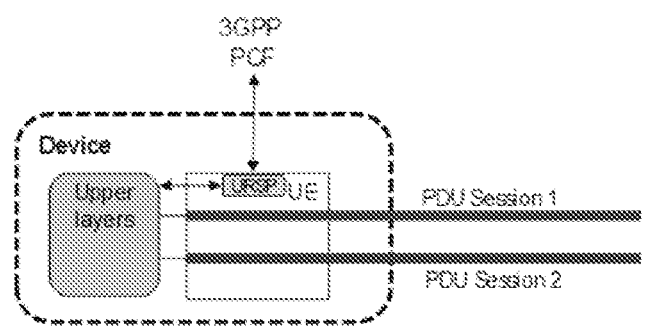
FIG. 1 is a schematic diagram of an exemplary conventional device that supports multiple Protocol Data Unit (PDU) Sessions based on 3GPP specification.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). While it may be possible to use Data Network Names (DNNs), Internet Protocol (IP) descriptors, or non-IP descriptors in User Equipment (UE) Route Selection Policies (URSP) Traffic Descriptors to differentiate data traffic associated with two PDU Sessions, the use of the DNNs, the IP descriptors, or the non-IP descriptors may add configuration burdens to the UE. For example, using DNNs in the URSP Traffic Descriptors may imply that the upper layers may need to be configured to include different DNNs, which may add an extra implementation burden to the upper layers. Note that the URSP mechanism may be used to define the DNNs of the PDU Session without including the DNNs in the Traffic Descriptors.

Using IP or non-IP descriptors in the URSP Traffic Descriptors may also present a configuration burden to the UE as it may be difficult to know in advance a specific range of IP addresses or Ethernet Virtual Local Area Networks (VLANs) to be applied to different PDU Sessions. In many cases, the range of IP addresses or Ethernet VLANs may be available only after the PDU Sessions have been established since the PDU Sessions may be used to download the corresponding configuration information, such as the range of IP addresses or Ethernet VLANs.

Certain aspects of the present disclosure and their embodiments may provide solutions to the aforementioned or other challenges. In examples discussed herein, a Port Number Traffic Descriptor is added as a new type of Traffic Descriptor for the URSP mechanism. In a non-limiting example, the Port Number Traffic Descriptor corresponds to a virtual internal port between an UE in a device (e.g., a modem) and upper layers of the device. Ports may be identified by a sequence number (e.g., 1, 2, 3, . . . ). In this regard, the URSP mechanism can define different Route Selection Descriptors for the different Traffic Descriptors having different Port Numbers, respectively. As such, it may be possible to differentiate the PDU Sessions solely based on the Port Numbers. As a result, it may not be necessary to set different DNNs, IP descriptors, or non-IP descriptors in the upper layers.

The URSP Traffic Descriptors, as defined in 3GPP TS 23.503, are modified to include the Port Numbers as a new and optional Traffic Descriptor. The upper layer (e.g., an Ethernet host, a bridge, or a relay) may provide the Port Number to the UE. The UE can then use the URSP rules to map different Port Numbers to different PDU Session parameter settings.

There are, disclosed herein, various embodiments which address one or more of the issues disclosed herein.

Certain embodiments may provide one or more of the following technical advantage(s).
  Simplifies configuration of the device especially for redundant traffic handling.
  No need to pre-configure DNNs or IP or non-IP descriptors in the device.
  PDU Sessions can be differentiated purely based on the internal Port Number.
  URSP rule structure matches the typical implementation.

Figure 2:
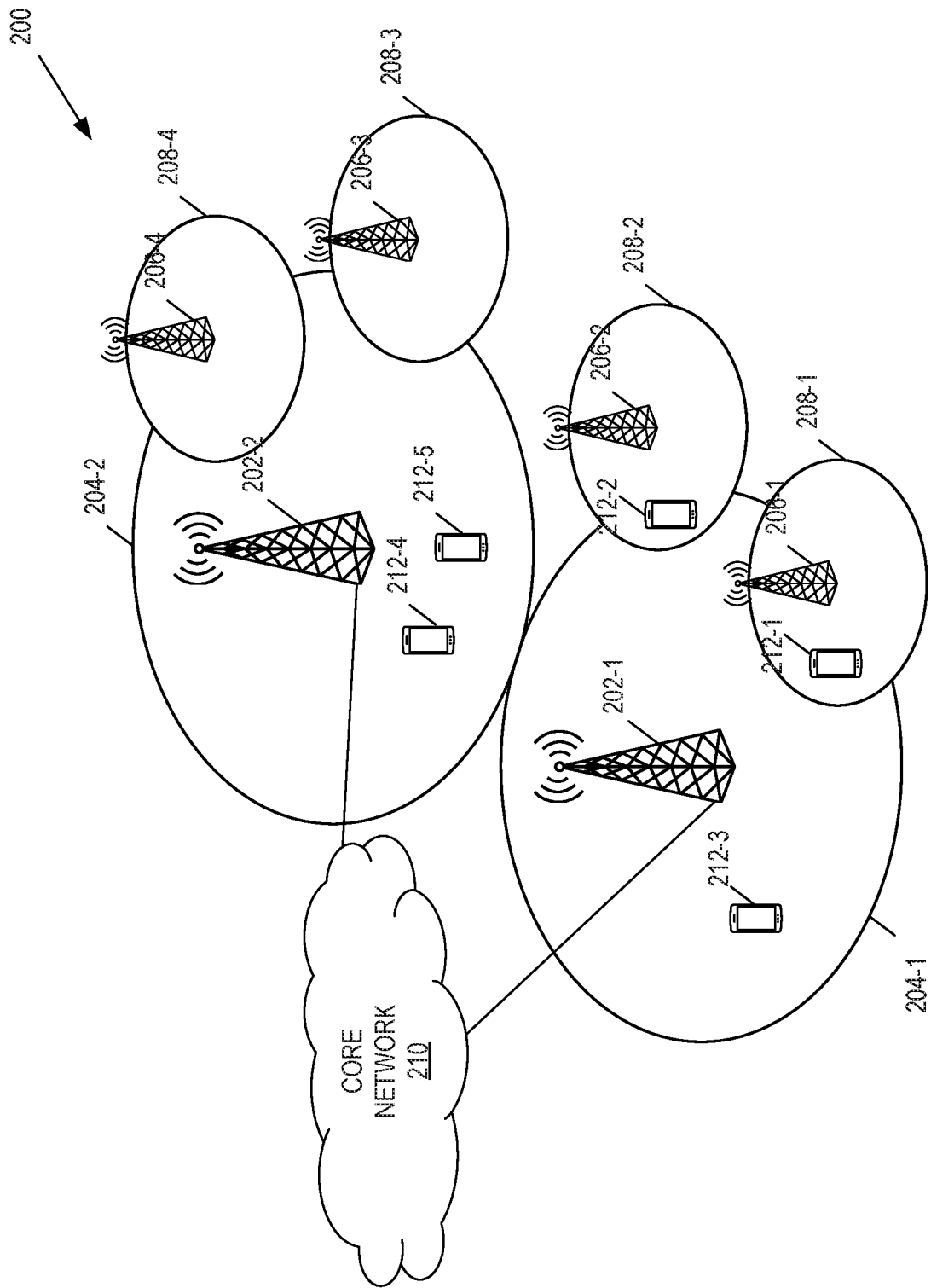
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a NR Radio Access Network (RAN) or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
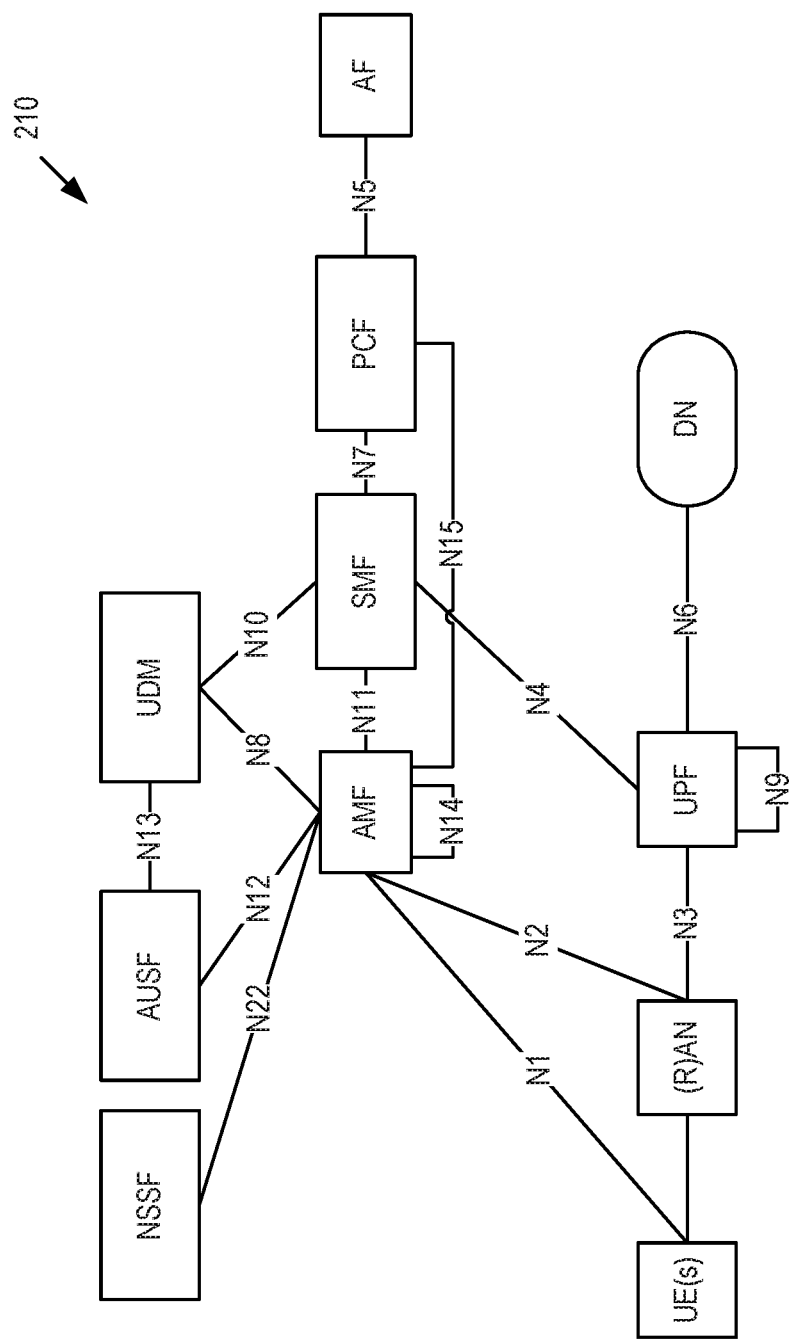
FIG. 3 illustrates a wireless communication system represented as a 5G network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/interface.

FIG. 3 can be viewed as one particular implementation of the system 200 of FIG. 2.

Seen from the access side the 5G network architecture shown in FIG. 3 comprises a plurality of UEs connected to either a RAN or an Access Network (AN) as well as an AMF. Typically, the R(AN) comprises base stations, e.g. such as eNBs or gNBs or similar. Seen from the core network side, the 5G core NFs shown in FIG. 3 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
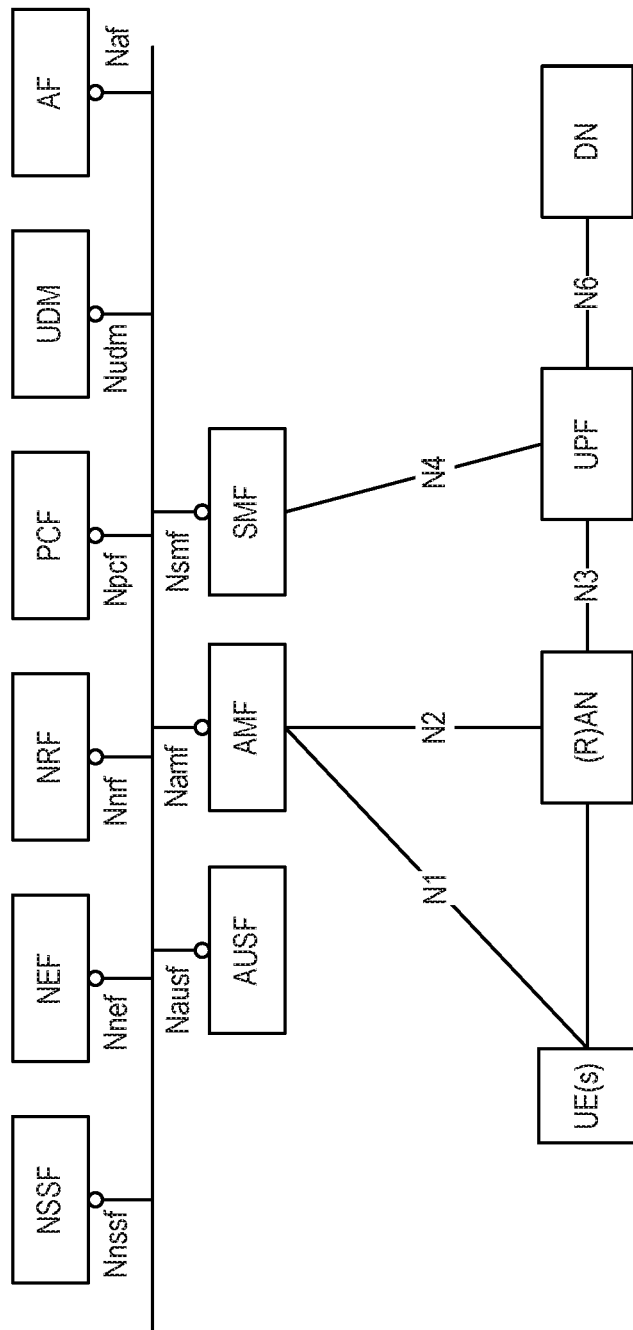
FIG. 4 illustrates a 5G network architecture using service-based interfaces between the NFs in the control plane, instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF and Nsmf for the service based interface of the SMF etc. The NEF and the NF NRF in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
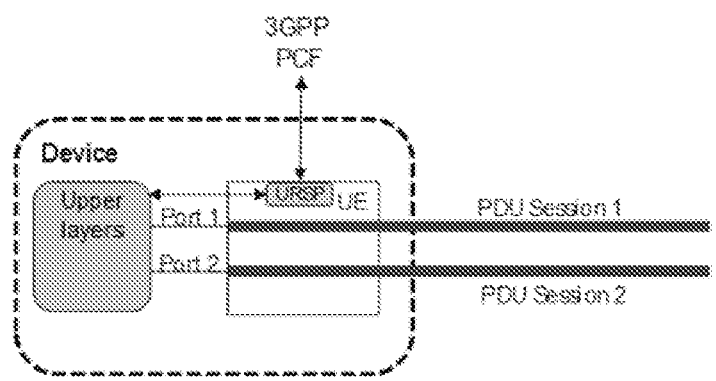
FIG. 5 provides an exemplary illustration of an embodiment of the present disclosure.

FIG. 5 provides an exemplary illustration of an embodiment of the present disclosure. The upper layers may be configured to specify one or more Traffic Descriptors associated with one or more distinct Port Numbers, respectively. The upper layers provide the Traffic Descriptors to a UE's URSP mechanism. The UE is configured with URSP rules downloaded from the operator's PCF in advance (also referred to as "configured URSP rules"), which may include different rules based on the distinct Port Numbers. Based on the URSP's mechanism, which matches the Traffic Descriptors specified by the upper layers with the URSP rules, the URSP mechanism may define Route Selection Descriptors. By determining the different rules based on the distinct Port Numbers, it may be possible to determine different Route Selection Descriptors, and therefore to set up PDU Sessions using different parameters (e.g., different DNNs and/or different S-NSSAIs) in the different Route Selection Descriptors. If the parameters correspond to an existing PDU Session, then the existing PDU Session may be used. Otherwise, a new PDU Session may be established.

The solution can be applied in a number of different embodiments depending on how the upper layers are structured. The upper layer may be configured to include an operating system, which may realize Ethernet functionality as an example, and applications running on top of the operating system. Also, the Ports may be bound to physical or virtual ports of an Ethernet bridge. A number of embodiments are discussed next as non-limiting examples. Although the examples discussed herein are based on Ethernet functionality, it should be appreciated that similar examples with IP functionality are also possible. In the case of IP, Deterministic Networking (DetNet) based functionality can be used for replication and elimination of packets.

Figure 6:
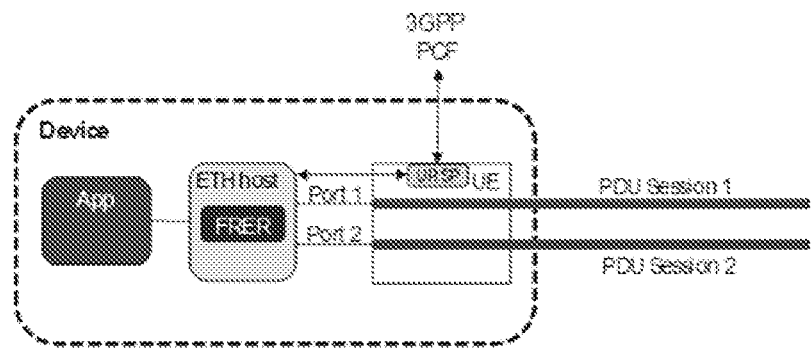
FIG. 6 provides an exemplary illustration of another embodiment of the present disclosure.

FIG. 6 provides an exemplary illustration of another embodiment of the present disclosure. In the example scenario shown in FIG. 6, there is an Ethernet host, which may be part of the operating system, within the device. The Ethernet host, which may act as an upper layer towards the UE, may be configured with multiple ports and sets up a PDU Session for each port. By specifying different Port Numbers in the URSP Traffic Descriptors, it may be possible for the URSP rules to map the Traffic Descriptors to different PDU Sessions. As such, the Ethernet host may act as a multi-homed host, with multiple (virtual) interfaces for example. The Ethernet host may be configured to use a different Media Access Control (MAC) address and VLAN combination on the multiple virtual interfaces. The MAC address and VLAN as well as the number of ports may be pre-configured by the device or dynamically configured Over The Air (OTA) using a configuration protocol associated with one of the PDU Sessions. In examples discussed hereinafter, the device may be configured by a central controller, such as a Centralized User Configuration (CUC) or Centralized Network Configuration (CNC).

The application may reside on top of the Ethernet host, and may use one of the PDU Sessions as Ethernet interfaces, as determined by the operating system of the device. It may also be possible to configure the device to use Frame Replication and Elimination for Reliability (FRER) functionality. In this case, the FRER may replicate/eliminate traffic over the multiple interfaces and the Ethernet host (e.g., the FRER) can hide the ports and the UE from the application. As a result, the application is not exposed directly to the multiple interfaces and a single virtual interface may be presented from the Ethernet host to the application.

In a non-limiting example, the Ethernet host is configured to generate one or more Traffic Descriptors including one or more unique Port Numbers and provide the Traffic Descriptors to the UE. The Ethernet host may also associate one or more UE sessions with one or more ports, respectively. The Ethernet hose may also receive PDU traffic from the upper layer and route the PDU traffic to the ports associated with the unique Port Numbers.

Figure 7:
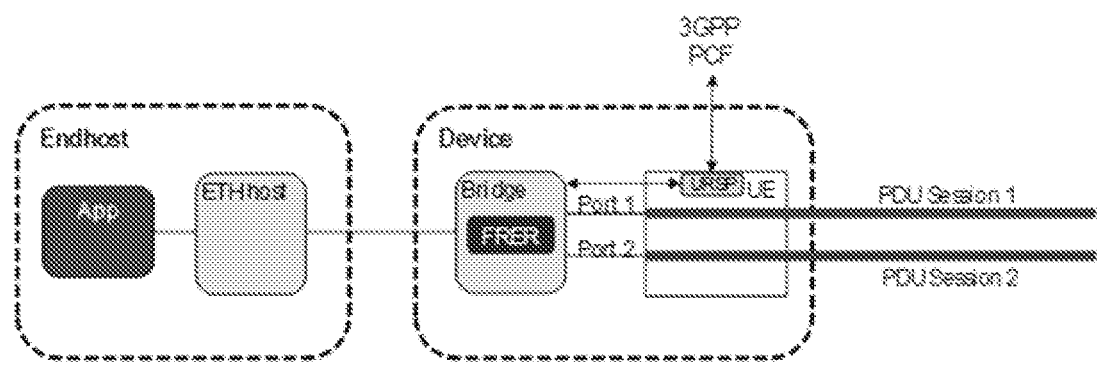
FIG. 7 provides an exemplary illustration of another embodiment of the present disclosure.

FIG. 7 provides an exemplary illustration of another embodiment of the present disclosure. The example shown in FIG. 7 is similar to the example shown in FIG. 6 except that an Endhost in FIG. 7, which includes the application and an Ethernet Endhost, is in a separate device from a terminal device that includes the UE and an Ethernet bridge. The Ethernet host may be coupled to the Ethernet Bridge via a single interface. Accordingly, the Ethernet host may receive data traffic from the application and communicate the data traffic to the Ethernet Bridge via the single interface. The Ethernet Bridge may be configured to set up multiple ports and map the multiple ports to different PDU Sessions based on the mechanism discussed in FIG. 5. In this example therefore the Ethernet Bridge may act as the upper layer to the UE from the URSP's point of view. The Ethernet Bridge may be part of the operating system of the terminal device. The Endhost may be coupled to the terminal device via a physical interface.

It may be possible that the Ethernet Bridge implements FRER functionality and replicates Ethernet frames over multiple ports. Alternatively, it may be possible to implement the Ethernet Bridge without FRER functionality. In this regard, the Ethernet Bridge may be configured to switch incoming Ethernet traffic to one of the Ports. Notably, it may be up to operator configuration as to how the multiple virtual ports are used within the terminal device.

In a non-limiting example, the Ethernet bridge is configured to generate one or more Traffic Descriptors including one or more unique Port Numbers. And provide the Traffic Descriptors to the UE. The Ethernet bridge may also associate one or more PDU Sessions with one or more ports, respectively. The Ethernet bridge may also receive the traffic from the Ethernet host. Accordingly, the Ethernet bridge may generate a PDU traffic based on the data traffic received from the Ethernet host and bridge the PDU traffic to the ports associated with the unique Port Numbers.

Figure 8:
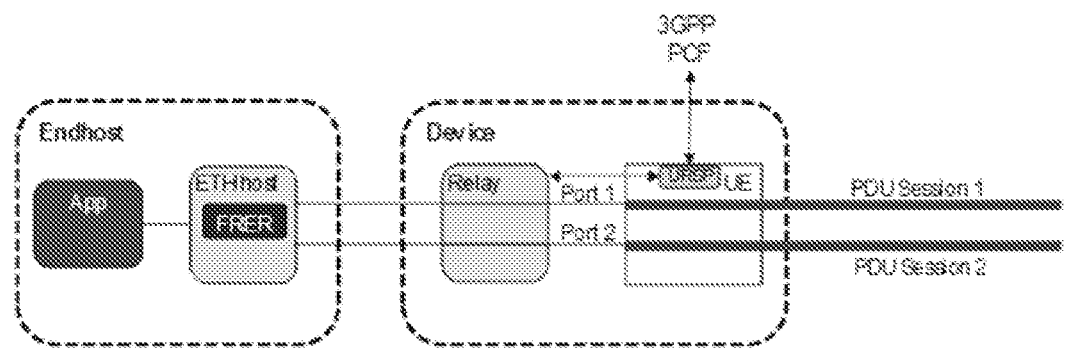
FIG. 8 provides an exemplary illustration of another embodiment of the present disclosure.

FIG. 8 provides an exemplary illustration of another embodiment of the present disclosure. As shown in FIG. 8, the device includes two external physical interfaces coupled to the Endhost. The device also includes a logical relay function, which may be part of the operating system and coupled to the UE via one or more internal ports corresponding to the PDU Sessions of the UE. The relay function may be configured to map the external physical interfaces to the internal ports and thus to the PDU Sessions of the UE. In this regard, there may be a one to one relationship between the external physical interfaces and the PDU Sessions. Accordingly, the logical relay function may be configured to relay traffic between the external physical interfaces and the PDU Sessions. The device may be connected to an external Endhost, which can be an Ethernet host with applications running on top of the Ethernet layer. It may be possible to configure the external Ethernet host to use the two external physical interfaces with or without the FRER functionality.

In this example, the relay function within the device may act as the upper layer for URSP. The relay function may be established based on device pre-configuration or based on over the air configuration. The configuration may determine the number of ports to be established, and the corresponding Traffic Descriptors. The URSP rules map the Port Numbers to the appropriate PDU Session parameters.

In a non-limiting example, the relay function is configured to generate one or more Traffic Descriptors having one or more unique Port Numbers and provide the Traffic Descriptors to the UE. The Ethernet host may be configured to receive the data traffic from the upper layer and route the data traffic to one or more physical ports. The relay function may be further configured to receive the data traffic from the Ethernet host via the physical ports. The relay function may be configured to map the physical ports to the internal ports, respectively. The relay function may be further configured to generate PDU traffic based on the data traffic and relay the PDU traffic to one or more internal ports.

Figure 9:
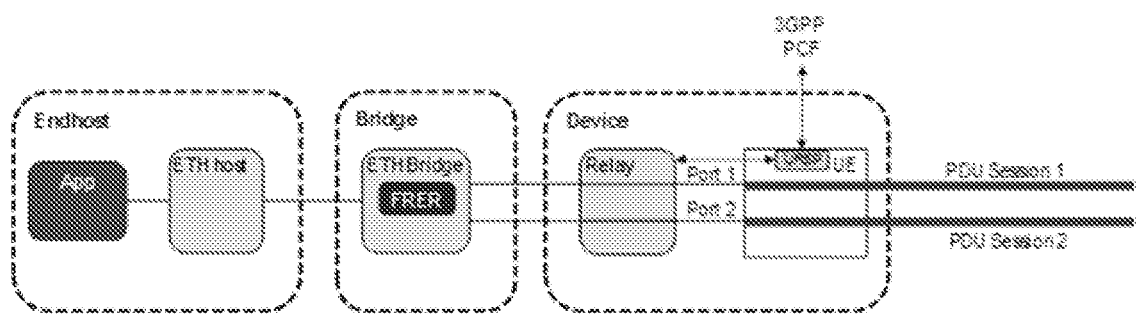
FIG. 9 provides an exemplary illustration of another embodiment of the present disclosure.

FIG. 9 provides an exemplary illustration of another embodiment of the present disclosure. The example shown in FIG. 9 is similar to the example in FIG. 8 from the device point of view. The difference is that the applications and the Ethernet Endhost in FIG. 9 reside in separate nodes, and there is an intermediate Bridge with multiple interfaces coupled to the device. There is a relay function within the device, which acts as the upper layer from the UE's point of view and functions as described above in FIG. 8.

In a non-limiting example, the relay function is configured to generate one or more Traffic Descriptors having one or more unique Port Numbers and provide the Traffic Descriptors to the UE. The Ethernet bridge may be configured to receive data traffic from the Endhost and bridge the data traffic to one or more physical ports. The relay function may be further configured to receive the data traffic via the physical ports. The relay function may be configured to map the physical ports to the internal ports, respectively. The relay function may be further configured to generate PDU traffic based on the data traffic and relay the PDU traffic to the internal ports.

Figure 10:
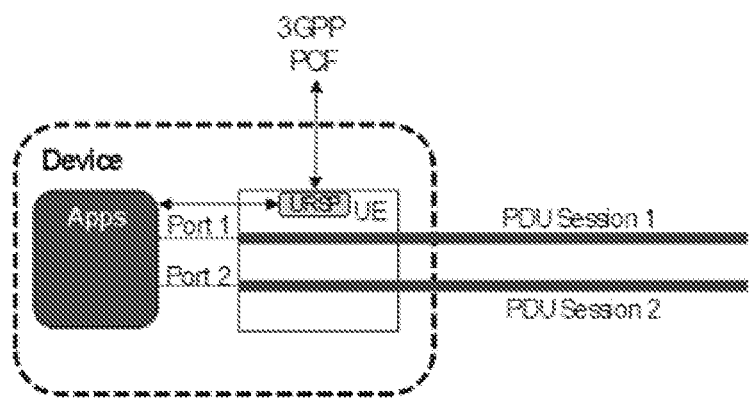
FIG. 10 provides an exemplary illustration of another embodiment of the present disclosure.

FIG. 10 provides an exemplary illustration of another embodiment of the present disclosure. In this example, an application layer handles the multiple PDU Sessions directly. This may be suitable, for example when the application layer is explicitly configured to send the redundant data. In this case, there may be no need for an Ethernet layer below the application to handle redundancy. There may also be an operating system layer (not shown), but the application layer (with the possible support of the operating system) may directly request establishment of the multiple PDU Sessions.

In this case, the use of the multiple Port Numbers makes it easier for the application to establish the PDU Sessions. The PDU Sessions can appear as multiple ports for the application, which can be referenced by the Port Numbers.

In a non-limiting example, the upper layer is configured to generate one or more Traffic Descriptors having one or more unique Port Numbers and provide the Traffic Descriptors to the UE. The upper layer may be further configured to associate one or more PDU Sessions with one or more ports associated with the unique Port Numbers, respectively and route the PDU traffic to the ports.

The following table shows the structure of the URSP rules as described in Table 6.6.2.1-2 of 3GPP TS 23.503. A new Port Number, as discussed above in FIGS. 5-10, can be added as an optional part of the Traffic Descriptor. When the Port Number is present, the Port Number may determine an internal port that is used to deliver data between the UE and the upper layers. The Port Number is unique within a single UE. The Port Number is an optional part of the data structure provided from the PCF to the UE, and it is matched against the Port Number provided by the upper layers to the UE.

Notably, the Table as shown below includes a number of existing Traffic Descriptors, such as IP descriptors, Non-IP descriptors, and DNN. In this regard, the Port Number may be used to uniquely identify a PDU Session independent of the existing Traffic Descriptors. In other words, the Port Number may be used to uniquely identify the PDU Session regardless of presence or absence of the DNN, the IP descriptors, and/or the non-IP descriptors.

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, Port Number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| Port Number | Internal Port Number that is used to deliver the user data between the UE and the upper layers. | Optional | Yes | UE context |
| List of Route Selection Descriptors | A list of Route Selection Descriptors. The components of a Route Selection Descriptor are described in table 6.6.2.1-3. | Mandatory | | |
| Rule Precedence | Determines the order the URSP rule is enforced in the UE. | Mandatory (NOTE 1) | Yes | UE context |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

Figure 11:
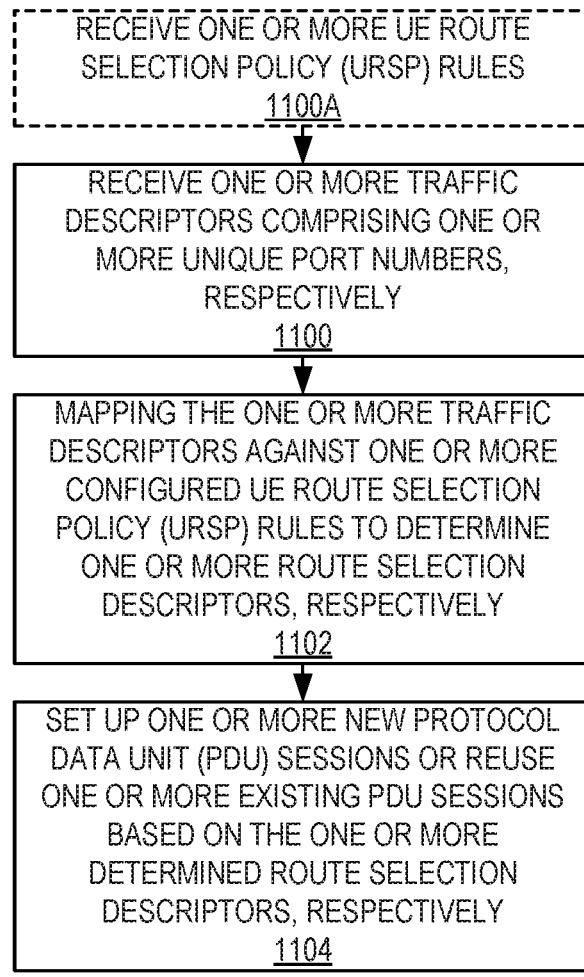
FIG. 11 provides an exemplary process for supporting multi-port UE route selection policies in a device including a User Equipment (UE) in accordance with at least some aspects of the embodiments described herein.

FIG. 11 provides an exemplary process for supporting multi-port UE Route Selection Policies in a device including a UE in accordance with at least some aspects of the embodiments described above. Initially, the UE receives one or more URSP rules (e.g., from a PCF or other network node) (step 1100A). The URSP rule(s) are stored at the UE. As described above, each URSP rule includes a Traffic Descriptor and a Route Selection Descriptor(s). In embodiments of the present disclosure, the Traffic Descriptor includes a Port Number. As described above, the UE may be configured to receive (1100), e.g., from an upper layer(s), one or more Traffic Descriptors comprising one or more unique Port Numbers, respectively. As also described above, the UE may also be configured to map (1102) the one or more received Traffic Descriptors against the Traffic Descriptor(s) of the configured URSP rule(s) (i.e., the URSP rule(s) received in step 1100A) to determine one or more Route Selection Descriptors, respectively. The UE may be further configured to set up (1104) one or more new PDU Sessions or reuse one or more existing PDU Sessions based on the one or more determined Route Selection Descriptors, respectively.

Figure 12:
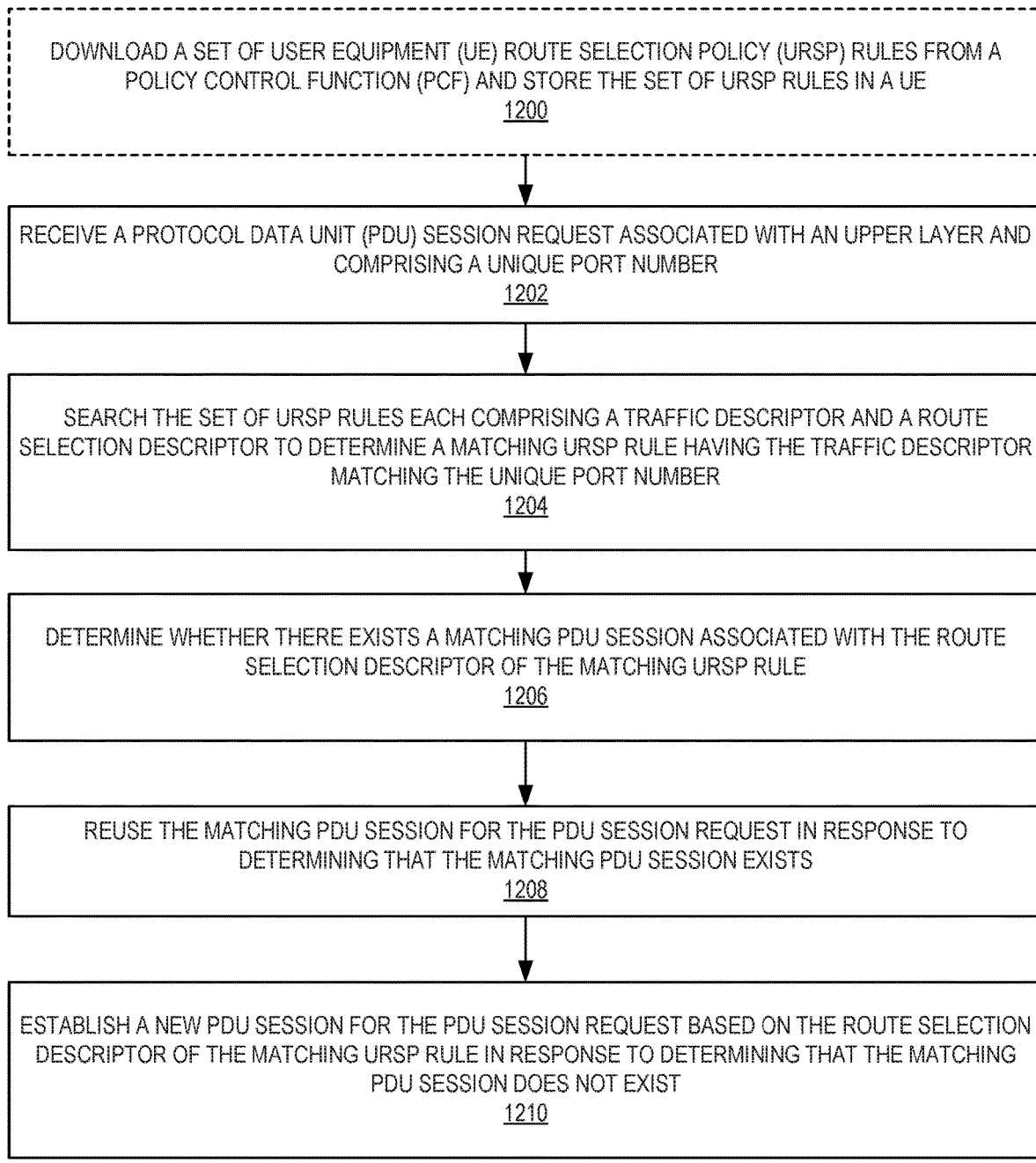
FIG. 12 is a flowchart providing an exemplary illustration of a method performed by a wireless device for establishing a PDU Session according to at least some aspects of the present disclosure.

FIG. 12 is a flowchart providing an exemplary illustration of a method performed by a wireless device for establishing a PDU Session according to at least some aspects of the present disclosure. The wireless device may download a set of URSP rules from a PCF and store the set of URSP rules in a UE residing in the wireless device (step 1200). Each of the set of URSP rules includes a Traffic Descriptor and Route Selection Descriptor. The wireless device receives a PDU Session request associated with an upper layer and includes a unique Port Number (step 1202). The wireless device then searches the set of URSP rules to determine a matching URSP rule having the Traffic Descriptor matching the unique Port Number (step 1204). The wireless device then determines whether there exists a matching PDU Session associated with the Route Selection Descriptor of the matching URSP rule (step 1206). The wireless device reuses the matching PDU Session for the PDU Session request in response to determining that the matching PDU Session exists (step 1208). Alternatively, the wireless device establishes a new PDU Session for the PDU Session request based on the Route Selection Descriptor of the matching URSP rule in response to determining that the matching PDU Session does not exist (step 1210).

Figure 13:
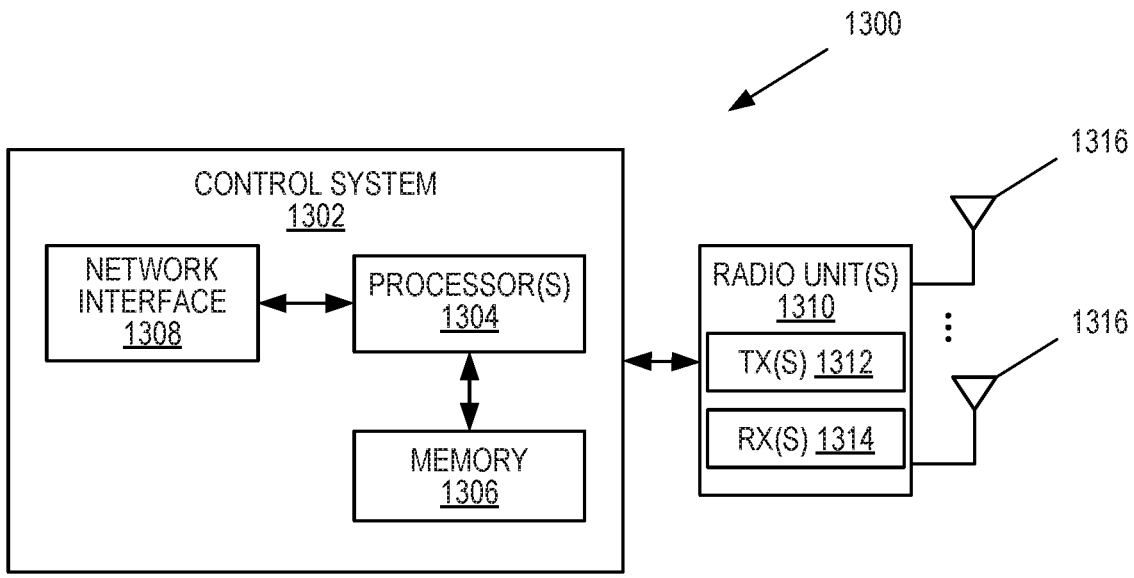
FIG. 13 is a schematic block diagram of a network node according to some embodiments of the present disclosure.

FIG. 13 is a schematic block diagram of a network node 1300 according to some embodiments of the present disclosure. The network node 1300 may be, for example, a base station 202 or 206 or a core network node (e.g., a network node that implements a core network function such as, e.g., a PCF). As illustrated, the network node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, if the network node 1300 is a radio access node, the network node 1300 may also include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a network node 1300 as described herein (e.g., one or more functions of a PCF). In some embodiments, the function(s) are implemented in software that is stored, e.g., in the memory 1306 and executed by the one or more processors 1304.

Figure 14:
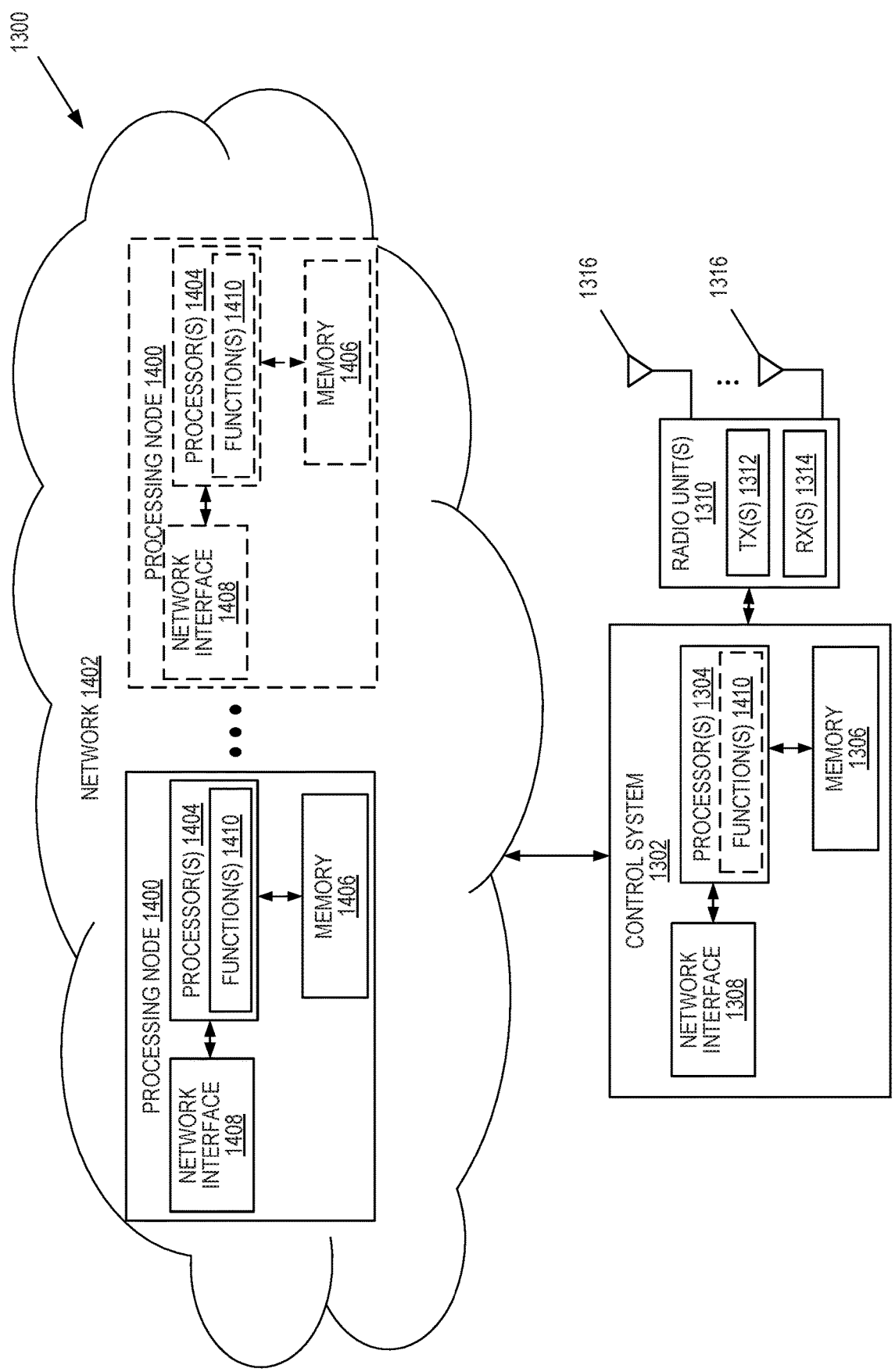
FIG. 14 is a schematic block diagram that illustrates a virtualized embodiment of the network node of FIG. 13 according to some embodiments of the present disclosure.

FIG. 14 is a schematic block diagram that illustrates a virtualized embodiment of the network node 1300 according to some embodiments of the present disclosure. As used herein, a "virtualized" network node is an implementation of the network node 1300 in which at least a portion of the functionality of the network node 1300 is implemented as a virtual component(s) (e.g., via a virtual machine(s) executing on a physical processing node(s) in a network(s)). As illustrated, in this example, the network node 1300 includes one or more processing nodes 1400 coupled to or included as part of a network(s) 1402. Each processing node 1400 includes one or more processors 1404 (e.g., CPUs, ASICs, FPGAs, and/or the like), memory 1406, and a network interface 1408. If the network node 1300 is a radio access node, the network node 1300 may also include the control system 1302 and/or the one or more radio units 1310, as described above. The control system 1302 may be connected to the radio unit(s) 1310 via, for example, an optical cable or the like.

In this example, functions 1410 of the network node 1300 described herein (e.g., functions of a PCF) are implemented at the one or more processing nodes 1400 or distributed across the control system 1302 and the one or more processing nodes 1400 in any desired manner. In some particular embodiments, some or all of the functions 1410 of the network node 1300 described herein are implemented as virtual components executed by one or more virtual machines implemented in a virtual environment(s) hosted by the processing node(s) 1400.

In some embodiments, a computer program including instructions which, when executed by at least one processor, causes the at least one processor to carry out the functionality of the network node 1300 or a node (e.g., a processing node 1400) implementing one or more of the functions 1410 of the network node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
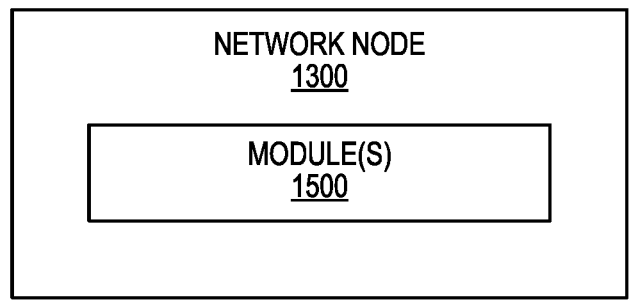
FIG. 15 is a schematic block diagram of the network node of FIG. 13 according to some other embodiments of the present disclosure.

FIG. 15 is a schematic block diagram of the network node 1300 according to some other embodiments of the present disclosure. The network node 1300 includes one or more modules 1500, each of which is implemented in software. The module(s) 1500 provide the functionality of the network node 1300 (e.g., functionality of a PCF) described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
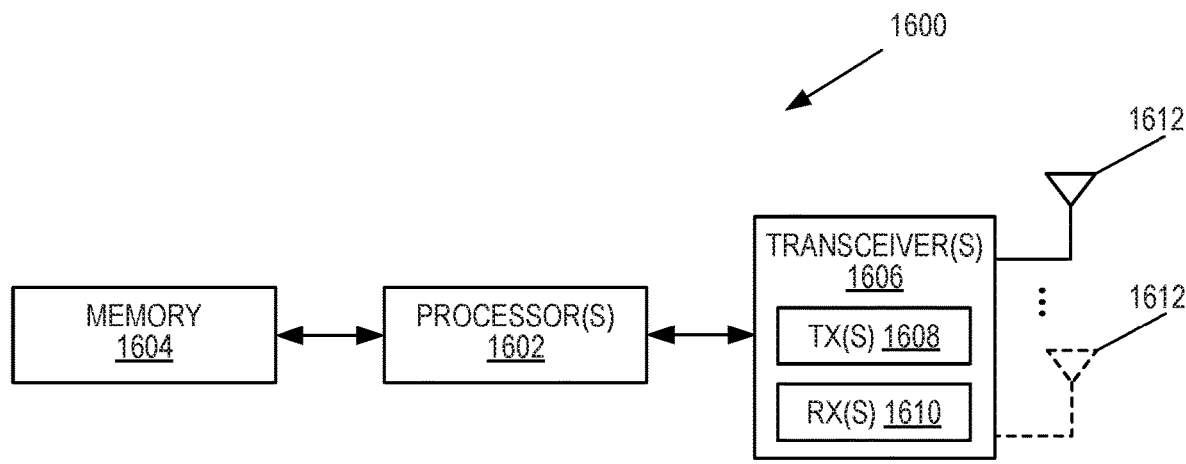
FIG. 16 is a schematic block diagram of a UE according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by one of ordinary skill in the art. The processors 1602 are also referred to herein as processing circuitry. The transceivers 1606 are also referred to herein as radio circuitry. In some embodiments, the functionality of the UE 1600 described above may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
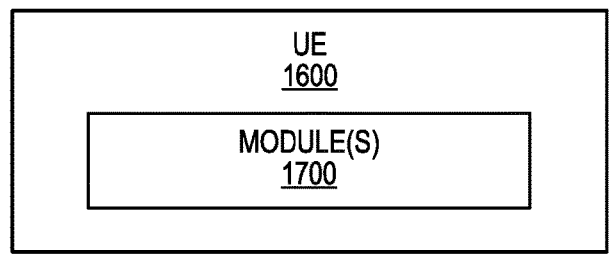
FIG. 17 is a schematic block diagram of the UE of FIG. 16 according to some other embodiments of the present disclosure.

FIG. 17 is a schematic block diagram of the UE 1600 according to some other embodiments of the present disclosure. The UE 1600 includes one or more modules 1700, each of which is implemented in software. The module(s) 1700 provides the functionality of the UE 1600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a device for supporting multi-port UE route selection policies wherein the device comprises a UE, the method comprising:
 at the UE:
  receiving (1100) one or more Traffic Descriptors comprising one or more unique Port Numbers, respectively;
  mapping (1102) the one or more Traffic Descriptors against one or more configured UE route selection policy (URSP) rules to determine one or more Route Selection Descriptors, respectively; and
  setting up (1104) one or more new Protocol Data Unit (PDU) sessions or reuse one or more existing PDU Sessions based on the one or more determined Route Selection Descriptors, respectively Embodiment 2: The method of embodiment 1, wherein:
 mapping (1102) the one or more Traffic Descriptors against the one or more configured URSP rules comprises matching the one or more unique Port Numbers in the one or more received traffic descriptors against one or more distinct Port Numbers predefined in the one or more configured URSP rules to determine the one or more Route Selection Descriptors corresponding to the one or more USRP rules, respectively; and
 setting up (1104) the one or more new PDU Sessions or reusing the one or more existing PDU Sessions comprises setting up the one or more new PDU Sessions or reusing the one or more existing PDU Sessions based on respective PDU Session parameters associated with the one or more determined Route Selection Descriptors.

Embodiment 3: The method of embodiment 1, wherein the device comprises:
 the UE, where the UE is configured to store the one or more configured USRP rules;
 an upper layer configured to communicate PDU traffic in the one or more PDU Sessions; and
 an Ethernet host coupled to the UE via one or more ports associated with the one or more unique Port Numbers, respectively, and coupled to the upper layer via a single interface.

Embodiment 4: The method of embodiment 3, further comprising:
 at the Ethernet host:
  generating the one or more Traffic Descriptors comprising the one or more unique Port Numbers;
  providing the one or more Traffic Descriptors to the UE;
  associating the one or more PDU Sessions with the one or more ports, respectively;
  receiving the PDU traffic from the upper layer; and
  routing the PDU traffic to the one or more ports.

Embodiment 5: The method of embodiment 3, wherein the Ethernet host comprises a Frame Replication and Elimination for Reliability (FRER) function configured to replicate/eliminate the PDU traffic across the one or more ports.

Embodiment 6: The method of embodiment 1, wherein the device comprises:
 the UE, where the UE is configured to store the one or more configured USRP rules; and
 an Ethernet bridge coupled to the UE via one or more ports associated with the one or more unique Port Numbers, respectively Embodiment 7: The method of embodiment 6, wherein the device is coupled to an Endhost separated from the device, the Endhost comprising:
 an Ethernet host coupled to the Ethernet bridge via a single interface
 an upper layer configured to communicate data traffic to the Ethernet host; and
 the Ethernet host is configured to communicate the data traffic to the Ethernet bridge via the single interface.

Embodiment 8: The method of embodiment 7, further comprising:
 at the Ethernet bridge:
  generating the one or more Traffic Descriptors comprising the one or more unique Port Numbers;
  providing the one or more Traffic Descriptors to the UE;
  associating the one or more PDU Sessions with the one or more ports, respectively;
  receiving the data traffic from the Ethernet host;
  generate a PDU traffic based on the data traffic; and
  bridging the PDU traffic to the one or more ports.

Embodiment 9: The method of embodiment 8, wherein the Ethernet bridge comprises a Frame Replication and Elimination for Reliability (FRER) function configured to replicate/eliminate the PDU traffic across the one or more ports.

Embodiment 10: The method of embodiment 1, wherein the device comprises:
 the UE, the UE configured to store the one or more configured USRP rules; and
 a relay function coupled to the UE via one or more internal ports associated with the one or more unique Port Numbers, respectively.

Embodiment 11: The method of embodiment 6, wherein the device is coupled to an Endhost separated from the device, the Endhost comprising:

an Ethernet host coupled to the relay function via one or more physical ports;
an upper layer configured to communicate data traffic to the Ethernet host; and
the Ethernet host is configured to communicate the data traffic to the relay function via the one or more physical ports.

Embodiment 12: The method of embodiment 7, further comprising:
at the relay function:
generating the one or more Traffic Descriptors comprising the one or more unique Port Numbers; and
providing the one or more Traffic Descriptors to the UE;
at the End host:
receiving the data traffic from the upper layer; and
routing the data traffic to the one or more physical ports; and
at the relay function:
receiving the data traffic from the Ethernet host via the one or more physical ports;
mapping the one or more physical ports to the one or more internal ports, respectively;
generating a PDU traffic based on the data traffic; and
relaying the PDU traffic to the one or more internal ports.

Embodiment 13: The method of embodiment 12, wherein the Ethernet host comprises a Frame Replication and Elimination for Reliability (FRER) function configured to replicate/eliminate the data traffic across the one or more physical ports.

Embodiment 14: The method of embodiment 1, wherein the device comprises:
the UE, the UE configured to store the one or more configured USRP rules; and
a relay function coupled to the UE via one or more internal ports associated with the one or more unique Port Numbers, respectively.

Embodiment 15: The method of embodiment 14, wherein the device is coupled to an Ethernet bridge separated from the device via one or more physical ports.

Embodiment 16: The method of embodiment 15, wherein the Ethernet bridge is coupled to an Endhost separated from Ethernet bridge and the device, the Endhost comprising:
an Ethernet host coupled to the Ethernet bridge via a single interface;
an upper layer configured to communicate data traffic to the Ethernet host; and
the Ethernet host is configured to communicate the data traffic to the Ethernet bridge via the single interface.

Embodiment 17: The method of embodiment 16, further comprising:
at the relay function:
generating the one or more Traffic Descriptors comprising the one or more unique Port Numbers; and
providing the one or more Traffic Descriptors to the UE;
at the Ethernet bridge:
receiving the data traffic from the Endhost; and
bridging the data traffic to the one or more physical ports; and
at the relay function:
receiving the data traffic via the one or more physical ports;
mapping the one or more physical ports to the one or more internal ports, respectively;
generating a PDU traffic based on the data traffic; and
relaying the PDU traffic to the one or more internal ports.

Embodiment 18: The method of embodiment 15, wherein the Ethernet bridge comprises a Frame Replication and Elimination for Reliability (FRER) function configured to replicate/eliminate the data traffic across the one or more physical ports.

Embodiment 19: The method of embodiment 1, wherein the device comprises:
the UE, the UE configured to store the one or more configured USRP rules; and
an upper layer coupled to the UE via one or more ports associated with the one or more unique Port Numbers, respectively, the upper layer configured to communicate PDU traffic in the one or more PDU Sessions.

Embodiment 20: The method of embodiment 19, further comprising:
at the upper layer:
generating the one or more Traffic Descriptors comprising the one or more unique Port Numbers;
providing the one or more Traffic Descriptors to the UE;
associating the one or more PDU Sessions with the one or more ports, respectively; and
routing the PDU traffic to the one or more ports.

Embodiment 21: A UE for supporting multi-port UE route selection policies, the UE comprising:
processing circuitry configured to perform any of the steps performed by a UE in any of embodiments 1 to 20; and
power supply circuitry configured to supply power to the wireless device.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
ASIC Application Specific Integrated Circuit
AUSF Authentication Server Function
CNC Centralized Network Configuration
CPU Central Processing Unit
CUC Centralized User Configuration
DETNET Deterministic Networking
DN Data Network
DSP Digital Signal Processor
eNB Enhanced or Evolved Node B
EPS Evolved Packet System
FPGA Field Programmable Gate Array
FRER Frame Replication and Elimination for Reliability
gNB New Radio Base Station
HSS Home Subscriber Server
IP Internet Protocol
LTE Long Term Evolution
MAC Media Access Control
MME Mobility Management Entity
MTC Machine Type Communication
NEF Network Exposure Function
NF Network Function
NR New Radio
NRF Network Function Repository Function NSSF Network Slice Selection Function
OTA Over The Air
PCF Policy Control Function
PDU Protocol Data Unit
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function
URSP User Equipment Route Selection Policies
VLANS Virtual Local Area Networks Those skilled in the art will recognize improvements and modifications to the embodiments of the present disclosure. All such improvements and modifications are considered within the scope of the concepts disclosed herein.

What is claimed is:

1. A method performed by a wireless device for establishing a Protocol Data Unit (PDU) session, comprising:
at a User Equipment (UE) comprised within the wireless device:
receiving a PDU Session request from an upper layer via an Ethernet host and a relay function, wherein:
the upper layer, the Ethernet host, and the relay function reside inside the wireless device;
the relay function is coupled to the UE via one or more internal ports associated with one or more unique Port Numbers respectively;
the Ethernet host is coupled to the relay function via one or more physical ports each mapped to a respective one of the one or more internal ports; and
the PDU Session request received from the upper layer via the Ethernet host comprises a unique Port Number from among the one or more unique Port Numbers associated with the one or more internal ports via which the Ethernet host is coupled to the relay function and the UE;
searching a set of UE Route Selection Policy (URSP) rules each comprising a Traffic Descriptor and a Route Selection Descriptor to determine a matching URSP rule having the Traffic Descriptor matching the unique Port Number;
determining whether there exists a matching PDU Session associated with the Route Selection Descriptor of the matching URSP rule;
reusing the matching PDU Session for the PDU Session request in response to determining that the matching PDU Session exists;
establishing a new PDU Session for the PDU Session request based on the Route Selection Descriptor of the matching URSP rule in response to determining that the matching PDU Session does not exist; and
the relay function is established based on one of: wireless device pre-configuration or over the air configuration, the configuration determines the number of ports to be established and the corresponding Traffic Descriptors.

2. The method of claim 1, further comprising, at the UE, downloading the set of URSP rules from a Policy Control Function (PCF) and storing the set of URSP rules in the UE.

3. The method of claim 1, further comprising, at the Ethernet host:
generating the PDU Session request that comprises the unique Port Number among the one or more unique Port Numbers;
providing the PDU Session request comprising the unique Port Number to the UE;
associating the matching PDU Session or the new PDU Session with a respective one of the one or more ports associated with the unique Port Number in the PDU Session request;
receiving PDU traffic from the upper layer; and
providing the PDU traffic to the respective one of the one or more ports associated with the unique Port Number in the PDU Session request.

4. The method of claim 1, wherein the Ethernet host comprises a Frame Replication and Elimination for Reliability (FRER) function configured to replicate/eliminate the PDU traffic across the one or more ports.

5. A wireless device, comprising:
a User Equipment (UE) comprising processing circuitry configured to cause the UE to:
receive a Protocol Data Unit, PDU, Session request from an upper layer via an Ethernet host and a relay function, wherein:
the upper layer, the Ethernet host, and the relay function reside inside the wireless device together with the UE;
the relay function is coupled to the UE via one or more internal ports associated with the one or more unique Port Numbers respectively;
the Ethernet host is coupled to the UE relay function via one or more physical ports each mapped to a respective one of the one or more internal ports; and
the PDU Session request received from the upper layer via the Ethernet host comprises a unique Port Number from among the one or more unique Port Numbers associated with the one or more internal ports via which the Ethernet host is coupled to the relay function and the UE;
search a set of UE Route Selection Policy (URSP) rules each comprising a Traffic Descriptor and a Route Selection Descriptor to determine a matching URSP rule having the Traffic Descriptor matching the unique Port Number;
determine whether there exists a matching PDU Session associated with the Route Selection Descriptor of the matching URSP rule;
reuse the matching PDU Session for the PDU Session request in response to determining that the matching PDU Session exists;
establish a new PDU Session for the PDU Session request based on the Route Selection Descriptor of the matching URSP rule in response to determining that the matching PDU Session does not exist; and
the relay function is established based on one of: wireless device pre-configuration or over the air configuration, the configuration determines the number of ports to be established and the corresponding Traffic Descriptors; and
power supply circuitry configured to supply power to the wireless device.

* * * * *